United States Patent
Morozov

(10) Patent No.: US 8,599,247 B2
(45) Date of Patent: Dec. 3, 2013

(54) STEREOSCOPIC IMAGE SYSTEM EMPLOYING AN ELECTRONIC CONTROLLER WHICH CONTROLS THE POLARIZATION PLANE ROTATOR IN SYNCHRONIZATION WITH AN OUTPUT IMAGE OF THE DISPLAY DEVICE

(75) Inventor: Aleksander Viktorovich Morozov, Moscow District (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 937 days.

(21) Appl. No.: 12/361,925

(22) Filed: Jan. 29, 2009

(65) Prior Publication Data

US 2009/0189976 A1 Jul. 30, 2009

(30) Foreign Application Priority Data

Jan. 30, 2008 (RU) ................................. 2008102976
Oct. 14, 2008 (KR) ........................ 10-2008-0100767

(51) Int. Cl.
*H04N 13/04* (2006.01)
*H04N 9/47* (2006.01)

(52) U.S. Cl.
USPC .................. 348/53; 348/42; 348/43; 348/44; 348/45; 348/46; 348/47; 348/48; 348/49; 345/648; 359/465

(58) Field of Classification Search
USPC .................. 348/53, 42–49; 345/648; 359/465
See application file for complete search history.

(56) References Cited

U.S. PATENT DOCUMENTS

| 4,719,482 | A | | 1/1988 | Hora |
| 4,884,876 | A | | 12/1989 | Lipton et al. |
| 4,921,334 | A | * | 5/1990 | Akodes ........................... 345/89 |
| 4,954,890 | A | | 9/1990 | Park |
| 5,933,127 | A | | 8/1999 | DuBois |
| 5,986,815 | A | * | 11/1999 | Bryars ........................ 359/634 |
| 6,252,707 | B1 | | 6/2001 | Kleinberger et al. |
| 6,943,852 | B2 | | 9/2005 | Divelbiss et al. |
| 7,271,803 | B2 | | 9/2007 | Ejiri et al. |
| 7,319,798 | B2 | | 1/2008 | Kim et al. |
| 7,699,472 | B2 | * | 4/2010 | Shestak ............................. 353/7 |
| 7,719,552 | B2 | * | 5/2010 | Karman ........................ 345/698 |
| 7,898,603 | B2 | * | 3/2011 | Sharp ............................. 349/13 |
| 8,159,526 | B2 | * | 4/2012 | Sato et al. ....................... 348/51 |
| 2002/0122145 | A1 | * | 9/2002 | Tung ................................ 349/96 |
| 2006/0055838 | A1 | * | 3/2006 | Mi et al. .......................... 349/30 |

(Continued)

FOREIGN PATENT DOCUMENTS

DE 102004026527 A1 12/2006
EP 0349692 A2 1/1990

(Continued)

*Primary Examiner* — Haresh N Patel
(74) *Attorney, Agent, or Firm* — Sughrue Mion, PLLC

(57) ABSTRACT

Provided is a stereoscopic image system. The stereoscopic image system includes a display device radiating linearly polarized light, glasses including left and right oculars each including a first polarizer disposed between the display device and the eyes of a user, a second polarizer disposed between the first polarizer and the eyes of the user, and a polarization plane rotator disposed between the first polarizer and the second polarizer, and a quarter wave plate disposed between the display device and the first polarizer. Accordingly, even when the glasses are rotated around a normal line to surfaces of the left and right oculars, a change in the brightness of a stereoscopic image can be reduced.

6 Claims, 1 Drawing Sheet

(56) References Cited

U.S. PATENT DOCUMENTS

| | | | |
|---|---|---|---|
| 2006/0285026 A1* | 12/2006 | Robinson | 349/15 |
| 2007/0035830 A1* | 2/2007 | Matveev et al. | 359/464 |
| 2007/0285774 A1* | 12/2007 | Merrirt et al. | 359/465 |
| 2008/0068715 A1* | 3/2008 | Magarill | 359/583 |
| 2008/0112049 A1* | 5/2008 | Umemoto et al. | 359/491 |
| 2008/0204874 A1* | 8/2008 | Kim et al. | 359/465 |
| 2008/0259012 A1* | 10/2008 | Fergason | 345/89 |
| 2009/0046899 A1* | 2/2009 | Northcott et al. | 382/117 |
| 2009/0052029 A1* | 2/2009 | Dai et al. | 359/486 |
| 2009/0087191 A1* | 4/2009 | Leard et al. | 398/152 |
| 2009/0263115 A1* | 10/2009 | Suzuki et al. | 396/18 |

FOREIGN PATENT DOCUMENTS

| | | |
|---|---|---|
| EP | 0831353 A1 | 3/1998 |
| JP | 340592 A | 2/1991 |
| RU | 2306680 C1 | 9/2007 |
| WO | 94/16353 A1 | 7/1994 |

\* cited by examiner

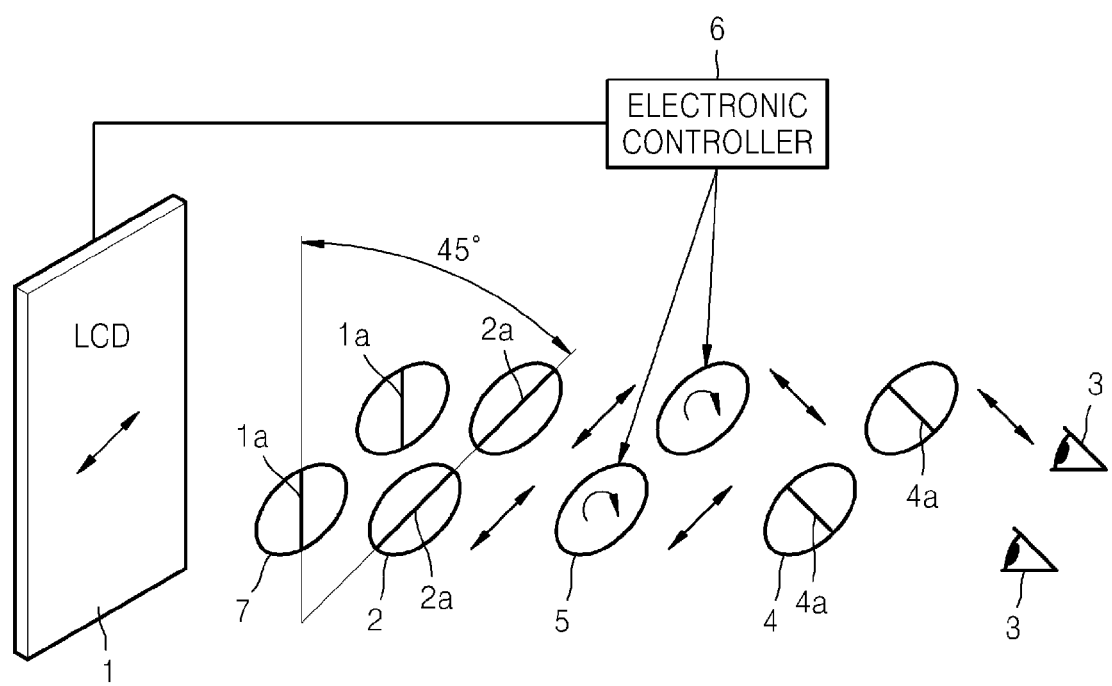

STEREOSCOPIC IMAGE SYSTEM EMPLOYING AN ELECTRONIC CONTROLLER WHICH CONTROLS THE POLARIZATION PLANE ROTATOR IN SYNCHRONIZATION WITH AN OUTPUT IMAGE OF THE DISPLAY DEVICE

CROSS-REFERENCE TO RELATED PATENT APPLICATION

This application claims the benefits of Russian Patent Application No. RU2008102976, filed on Jan. 30, 2008, in the Russian Patent Office and Korean Patent Application No. 10-2008-0100767, filed on Oct. 14, 2008, in the Korean Intellectual Property Office, the disclosures of which are incorporated herein in their entirety by reference.

BACKGROUND OF THE INVENTION

1. Field of the Invention

Example embodiments of the present invention relates to a stereoscopic image system that can be used as video equipment to display black-and-white and color stereoscopic images.

2. Description of the Related Art

In many modern systems, a stereoscopic image is produced due to temporary division of images by means of a display device radiating linearly polarized light, such as a liquid crystal display (LCD), three-dimensional (3D) glasses, and an electronic controller connected to the display device and the 3D glasses.

In such systems, the display device presents a pair of stereoscopic images, which are divided in time, to the left and right eyes of a user, and the 3D glasses are controlled by the electronic controller so that only one ocular for the left (or right) eye is transparent during the display of one stereoscopic image corresponding to the left (or right) eye. That is, the 3D glasses are transparent for the left eye and opaque for the right eye during the display of one stereoscopic image corresponding to the left eye and the situation is inverted during the display of the other stereoscopic image corresponding to the right eye.

The structure of a conventional system for producing 3D images needs to be simpler to be realized and adjusted. If a display device, such as an LCD, for radiating linearly polarized light is used, the conventional system may suffer a change in the brightness of an image due to the rotation of oculars. Accordingly, there is a demand to reduce or prevent such a change in the brightness.

SUMMARY OF THE INVENTION

Example embodiments of the present invention provide a stereoscopic image system for producing a stereoscopic image with stable quality even when glasses are rotated around a normal line to surfaces of oculars.

Example embodiments of the present invention also provide a stereoscopic image system including a quarter wave plate disposed between a display device and a first polarizer wherein a fast axis of the quarter wave plate is inclined at 45 degrees with respect to a polarization axis of the first polarizer.

According to an example embodiment, there is provided a stereoscopic image system comprising: a display device radiating linearly polarized light; glasses comprising left and right oculars respectively corresponding to the left and right eyes of a user, each of the left and right oculars comprising a first polarizer disposed between the display device and the eyes of the user, a second polarizer disposed between the first polarizer and the eyes of the user, and a polarization plane rotator disposed between the first polarizer and the second polarizer; an electronic controller controlling the polarization plane rotator by being synchronized with an output image of the display device; and a quarter wave plate disposed between the display device and the first polarizer.

A fast axis of the quarter wave plate may be inclined at 45 degrees with respect to a polarization axis of the first polarizer.

The display device may be a liquid crystal display (LCD).

The first and second polarizers and the quarter wave plate may be provided in the form of films.

Two quarter wave plates may be respectively disposed between the display device and two first polarizers.

The quarter wave plate may be attached to a screen of the display device.

A polarization axis of the first polarizer and a polarization axis of the second polarizer may be perpendicular to each other.

A polarization axis of the first polarizer and a polarization axis of the second polarizer may be parallel to each other.

The display device may radiate linearly polarized light and produce and present a pair of stereoscopic images, which are separated in time, to the left eye and the right eye of the user.

The electronic controller may be connected to the display device and control the polarization plane rotator by being synchronized with an output image of the display device.

Since the quarter wave plate is disposed between the display device and the first polarizer, quality degradation due to the rotation of the glasses can be reduced. Also, since the fast axis of the quarter wave plate is inclined at 45 degrees with respect to the polarization axis of the first polarizer, quality degradation due to the rotation of the glasses can be further reduced.

BRIEF DESCRIPTION OF THE DRAWINGS

The above and other features of example embodiments of the present invention will become more apparent by describing in detail exemplary embodiments thereof with reference to the attached drawings in which:

FIG. 1 is a schematic view of a stereoscopic image system according to an embodiment of the present invention.

DETAILED DESCRIPTION OF THE INVENTION

A stereoscopic image system according to example embodiments of the present invention can provide a stereoscopic image with stable quality even when glasses are rotated around a normal line to surfaces of oculars. The example embodiments will now be described more fully with reference to the accompanying drawings, in which exemplary embodiments of the invention are shown.

Referring to FIG. 1, the stereoscopic image system includes a display device 1 radiating linearly polarized light, glasses having left and right oculars each including a first polarizer 2 disposed between the display device 1 and eyes 3 of a user and a second polarizer 4 disposed between the first polarizer 2 and the eyes 3 of the user, and a polarization plane rotator 5 disposed between the first polarizer 2 and the second polarizer 4 and controlling a polarization plane of light passing through the polarization plane rotator 5.

The polarization plane rotator 5 is connected to an electronic controller 6 that is connected to the display device 1. The stereoscopic image system also includes a quarter wave plate 7 disposed between the display device 1 and the first polarizer 2. A fast axis 1a of the quarter wave plate 7 may be inclined at 45 degrees with respect to a polarization axis 2a of the first polarizer 2. Polarization axes of the first polarizer 2 and the second polarizer 4 may be perpendicular to each other or parallel to each other. The quarter wave plate 7 may be included in the left and right oculars of the glasses, or may be attached to a surface of a screen of the display device 1. In this case, one quarter wave plate 7 is shared by the two left and right oculars. Alternatively, two quarter wave plates 7 may be disposed between the display device 6 and two first polarizers 2. In this case, the two quarter wave plates 7 are respectively included in the left and right oculars of the glasses, not being attached to the screen of the display device 1. Both directions marked by arrows in FIG. 1 are directions of polarization axes after light radiated from the display device 1 passes through the left and right oculars.

The first and second polarizers 2 and 4 and the quarter wave plate 7 may be provided in the form of films. The operation of the stereoscopic image system will now be explained assuming that the display device 1 is a liquid crystal display (LCD).

The display device 1 presents a pair of stereoscopic images, which are divided in time, to the left and right eyes of the user. The glasses operate by being synchronized with the display device 1, such that the glasses are transparent for one eye and opaque for the other eye when the display device 1 displays one stereoscopic image corresponding to the one eye. In FIG. 1, the glasses are opaque for the right eye (upper eye) and are transparent for the left eye (lower eye).

A liquid crystal panel of the display device 1 radiates only linearly polarized light. The electronic controller 6 generates a control signal for the polarization plane rotator 5 in order to rotate the polarization plane of the passing light radiated from the display device 1. In an exemplary embodiment, the polarization plane rotator 5 includes a left polarization plane rotator and a right polarization plane rotator. The electronic controller 6 controls one of the left and the right polarization plane rotators independently of the other of the left and the right polarization plane rotators.

Through the independent control of the left and the right polarization plane rotators, the left and right oculars of the glasses are opened (transparent) or closed (opaque) according to the control signal of the electronic controller 6. For example, the independent control permits the left ocular to be transparent while the right ocular is opaque, and vice versa. The operation of the oculars is synchronized with the operation of the liquid crystal panel, that is, a stereoscopic image output signal. Since the quarter wave plate 7 has the fast axis 1a that is inclined at 45 degrees with respect to the polarization axis 2a, which is a direction in which the passing-through light is polarized, of the first polarizer 2, the linearly polarized light at the output of the first polarizer can be absorbed. The intensity of the linearly polarized light at the output of the first polarizer 2 does not depend on an angle between the fast axis 1a of the quarter wave plate 7 and the polarization plane of light radiated from the display device 1.

The stereoscopic image system can be applied both in home and in professional systems for producing stereoscopic images, in particular, in a training system, a computer game system, and in other areas where black-and-white or color stereoscopic images are used.

While the present invention has been particularly shown an described with reference to exemplary embodiments thereof, it will be understood by one of ordinary skill in the art that various modifications, supplements and replacements may be made therein so far as they do not go beyond the spirit and the scope of the present invention as defined by the following claims.

What is claimed is:

1. A stereoscopic image system comprising:
a display device which radiates linearly polarized light;
glasses comprising a left ocular and a right ocular respectively corresponding to a left eye and a right eye of a user, wherein the left ocular comprises a first left polarizer disposed between the display device and the left eye of the user, a second left polarizer disposed between the first left polarizer and the left eye of the user, and a left polarization plane rotator disposed between the first left polarizer and the second left polarizer of the left ocular, and
wherein the right ocular comprises a first right polarizer disposed between the display device and the right eye of the user, a second right polarizer disposed between the first right polarizer and the right eye of the user, and a right polarization plane rotator disposed between the first right polarizer and the second right polarizer;
an electronic controller which controls the left polarization plane rotator and the right polarization plane rotator in synchronization with an output image of the display device; and
a quarter wave plate disposed between the display device and the first left polarizer of the left ocular and the first right polarizer of the right ocular,
wherein a fast axis of the quarter wave plate is inclined at 45 degrees with respect to a polarization axis of one of the first left polarizer of the left ocular and the first right polarizer of the right ocular, and
wherein the quarter wave plate comprises a left quarter wave plate and a right quarter wave plate, the left quarter wave plate disposed between the display device and the first left polarizer of the left ocular and the right quarter wave plate disposed between the display device and the first right polarizer of the right ocular.

2. The stereoscopic image system of claim 1, wherein the display device is a liquid crystal display (LCD).

3. The stereoscopic image system of claim 1 wherein the first left polarizer, the first right polarizer, the second left polarizer, the second right polarizer and the quarter wave plate are provided in a form of films.

4. The stereoscopic image system of claim 1, wherein the quarter wave plate is attached to a screen of the display device.

5. The stereoscopic image system of claim 1, wherein a polarization axis of one of the first left polarizer of the left ocular and the first right polarizer of the right ocular and a polarization axis of a corresponding one of the second left polarizer of the left ocular and the second right polarizer of the right ocular are perpendicular to each other.

6. The stereoscopic image system of claim 1, wherein a polarization axis of one of the first left polarizer of the left ocular and the first right polarizer of the right ocular and a polarization axis of a corresponding one of the second left polarizer of the left ocular and the second right polarizer of the right ocular are parallel to each other.

* * * * *